United States Patent
Kartalopoulos (10) Patent No.: US 9,216,796 B2
(45) Date of Patent: Dec. 22, 2015

(54) SELF-BALANCING MULTIFUNCTIONAL WHEELBARROW

(75) Inventor: Stamatios V. Kartalopoulos, Annandale, NJ (US)

(73) Assignee: Stamatios V. Kartalopoulos, Annandale, NJ (US)

( * ) Notice: Subject to any disclaimer, the term of this patent is extended or adjusted under 35 U.S.C. 154(b) by 309 days.

(21) Appl. No.: 13/378,999

(22) PCT Filed: Jun. 11, 2010

(86) PCT No.: PCT/US2010/001687
§ 371 (c)(1),
(2), (4) Date: Dec. 16, 2011

(87) PCT Pub. No.: WO2010/147630
PCT Pub. Date: Dec. 23, 2010

(65) Prior Publication Data
US 2012/0091674 A1  Apr. 19, 2012

Related U.S. Application Data

(60) Provisional application No. 61/187,346, filed on Jun. 16, 2009.

(51) Int. Cl.
*B62B 1/24* (2006.01)
*B63B 1/18* (2006.01)

(52) U.S. Cl.
CPC ............. *B63B 1/18* (2013.01); *B62B 2301/12* (2013.01); *B62B 2301/254* (2013.01); *Y10T 29/49764* (2015.01)

(58) Field of Classification Search
USPC ....... 280/47.3, 47.31, 47.315, 47.32
See application file for complete search history.

(56) References Cited

U.S. PATENT DOCUMENTS

| | | | | |
|---|---|---|---|---|
| 2,544,505 A | * | 3/1951 | Kronhaus | 414/554 |
| 2,967,058 A | * | 1/1961 | Hoffmann, Jr. | 280/30 |
| 3,054,622 A | * | 9/1962 | Davis et al. | 280/645 |
| 3,282,598 A | * | 11/1966 | Goodwin | 280/11.208 |
| 3,333,861 A | * | 8/1967 | Hoffman | 280/47.32 |
| 3,512,796 A | * | 5/1970 | Mangus | 280/11.227 |
| 3,677,571 A | * | 7/1972 | Maturo et al. | 280/654 |
| 3,693,993 A | * | 9/1972 | Mazzarelli et al. | 280/30 |
| 3,820,807 A | * | 6/1974 | Curran | 80/47.3 |
| 3,826,511 A | * | 7/1974 | Frank | 280/653 |
| 3,827,369 A | | 8/1974 | Mueller | |
| 4,058,377 A | | 11/1977 | Schminke et al. | |
| 4,218,015 A | * | 8/1980 | Dean | 239/147 |
| 4,815,761 A | * | 3/1989 | Henderson et al. | 280/47.3 |

(Continued)

*Primary Examiner* — Jeffrey J Restifo
(74) *Attorney, Agent, or Firm* — Klauber & Jackson LLC (57) ABSTRACT

A wheelbarrow for carrying materials that includes a container, a pair of handles extending rearwardly from the container to control movement of the wheelbarrow and a pair of legs extending downwardly from the container to contact the ground. The wheel also has a barrel shaped wheel located at a predetermined location near the front end of the container. The wheelbarrow is self-balanced by strategically positioning the barrel-shaped wheel under and a little forward the center of gravity of the wheelbarrow; that is, the contact point of the wheel with the ground is slightly offset forwardly underneath the center of gravity of the wheelbarrow so that lifting, pushing and tilting requires minimal force and allows for superior control and maneuverability. Due to the shape and width of the wheel, during turns, the center of gravity of the wheelbarrows remains vertically, stably and near the point of contact of the wheel with the ground.

13 Claims, 7 Drawing Sheets

(56) References Cited

U.S. PATENT DOCUMENTS

| | | | |
|---|---|---|---|
| 4,844,492 A * | 7/1989 | Ludwig | 280/11.227 |
| 4,962,833 A * | 10/1990 | McCurdy | 188/2 R |
| 5,005,844 A * | 4/1991 | Douglas et al. | 280/1.5 |
| 5,067,737 A * | 11/1991 | Broeske | 280/47.31 |
| 5,190,351 A * | 3/1993 | Klumpjan | 298/3 |
| 5,660,403 A * | 8/1997 | O'Neill et al. | 280/47.19 |
| 5,758,887 A | 6/1998 | Bobst | |
| 5,820,141 A * | 10/1998 | Wilkerson et al. | 280/30 |
| 5,826,895 A * | 10/1998 | Bradfield | 280/87.042 |
| 6,019,382 A * | 2/2000 | Bouden | 280/87.042 |
| 6,059,303 A * | 5/2000 | Bradfield | 280/87.042 |
| 6,193,265 B1 * | 2/2001 | Yemini | 280/653 |
| 6,203,033 B1 * | 3/2001 | Knoll | 280/47.3 |
| 6,209,894 B1 * | 4/2001 | Walker, IV | 280/87.042 |
| 6,213,482 B1 * | 4/2001 | Yemini | 280/47.26 |
| 6,267,394 B1 * | 7/2001 | Bouden | 280/87.042 |
| 6,343,803 B1 * | 2/2002 | Johnston | 280/87.042 |
| 6,547,309 B1 * | 4/2003 | Franklin et al. | 296/98 |
| 6,698,776 B2 * | 3/2004 | Todd | 280/87.042 |
| 6,736,417 B1 * | 5/2004 | Whitmire | 280/47.3 |
| 6,755,478 B2 * | 6/2004 | Messinger-Rapport | 298/3 |
| 6,764,093 B2 * | 7/2004 | Allsop et al. | 280/653 |
| 6,845,992 B1 * | 1/2005 | Gee | 280/47.3 |
| 6,902,184 B2 * | 6/2005 | Hsu | 280/653 |
| 7,004,504 B1 * | 2/2006 | Paulovits, Jr. | 280/809 |
| 8,500,146 B2 * | 8/2013 | Genov et al. | 280/87.042 |
| 2001/0045718 A1 | 11/2001 | Boirum | |
| 2002/0153686 A1 * | 10/2002 | Todd | 280/87.042 |
| 2003/0137118 A1 | 7/2003 | Sanskrit | |
| 2004/0135333 A1 | 7/2004 | Feick | |
| 2007/0257451 A1 | 11/2007 | Furuta et al. | |
| 2011/0079976 A1 * | 4/2011 | Seip | 280/87.042 |
| 2012/0205884 A1 * | 8/2012 | Craven et al. | 280/47.3 |
| 2013/0026728 A1 * | 1/2013 | Genov et al. | 280/87.042 |

* cited by examiner

SELF-BALANCING MULTIFUNCTIONAL WHEELBARROW

CROSS REFERENCE TO RELATED APPLICATIONS

The present application is a National Stage Application claiming the priority of co-pending PCT Application No. PCT/US2010/001687 filed Jun. 11, 2010, which in turn, claims priority from U.S. Provisional Application Ser. No. 61/187,346, filed Jun. 16, 2009. Applicants claim the benefits of 35 U.S.C. §120 as to the PCT application and priority under 35 U.S.C. §119 as to the said U.S. Provisional application, and the entire disclosures of both applications are incorporated herein by reference in their entireties.

FIELD OF THE INVENTION

This invention relates to wheelbarrows and particularly to a structural shape wheel design that is positioned under and near the center of gravity of a wheelbarrow providing self-balancing and allowing the wheelbarrow to be operated by one operator and with very little lifting and pushing force.

BACKGROUND OF THE INVENTION

Wheelbarrows of different design and configuration comprise a container, two handles for lifting and pushing, one or two wheels mounted at the front of the container extending downwardly therefrom, and two legs at the rear of the container, also extending downwardly therefrom. When the wheelbarrow is at rest, balancing and stability is maintained by the two rear legs and the one or two front wheels. The stability of the wheelbarrow in this case is determined by the center of gravity (CoG) of the bulk material in the wheelbarrow and of the wheelbarrow's geometric shape that is defined by the contact points of the two legs and the one or two wheels with the ground. The two legs and one wheel define a triangle, that is, a triangle of stability, whereas two legs and two wheels define a trapezoid. It is well-known that as long as the CoG falls within this triangle or trapezoid of stability, the wheelbarrow is in a stable state. However, as the wheelbarrow is lifted and is moved forwardly or tilted laterally, the CoG also moves from its initial position forwardly and/or laterally, accordingly. Similarly, as the wheelbarrow is lifted and it is moved forwardly or tilted laterally, the geometric shapes that define stability i.e. triangle or trapezoid, change shape because they are now defined by the legs of the operator and the contact between the wheel or wheels with the ground. In such case, the CoG often falls outside the newly defined stability geometric shape.

To lift a loaded wheelbarrow, a substantial lifting force is required that depends on the actual load, the position of the CoG with respect to distance between the CoG and the wheel axle, and on the distance between the handles and the wheel axle, as they are defined by established equations of the lever. When the wheelbarrow is pushed laterally to make a left or a right turn, as it tilts to the left or to the right the CoG moves to the left or to the right, accordingly.

In the case of a single flat wheel, the CoG tends to move outside the triangle of stability and therefore in addition to the pushing force, a differential counterbalancing force is required, which acts on the wrists of the operator. If the load is substantial, the tilting unbalancing force may be stronger than the counterbalancing force and the result is disastrous; the wheelbarrow goes out of balance.

In the case of two wheels mounted on the sides of the container, when the wheelbarrow is lifted, a lifting force is required as in the previous case, with the amount of force still depending on the load, the CoG position with respect to distance between the CoG and the wheel axle, and on the distance between the handles and the wheel axle. However, when the wheelbarrow is pushed to make a left or right turn, the wheelbarrow is not as easy to maneuver because the two front side wheels are fixed and they drag on the ground unevenly due to the unequal radii of the turn. In an automobile, this is ameliorated by turning the two front wheels accordingly to equalize the radii of the arc of the turn. Thus, although tilting is not as big of a problem as in the single wheel case, turning the wheelbarrow by a single operator is particularly bothersome if the load is substantial and if the turn is sharp. It is the differential dragging of the two wheels in this case that requires additional effort by the operator to easily maneuver and control the two-wheel wheelbarrow.

Some of the above shortcomings have been addressed by various two wheel-design wheelbarrows and by various single wheel-design wheelbarrows with a ball shape. Examples are U.S. Pat. Nos. 4,058,344; 3,827,369; 2,967,058, and 6,193,265 B1. However, none of these or others, discloses or suggests a multipurpose wheelbarrow design, which, with minimal force and effort, is easily maneuverable, controllable, and has superior stability under all modes of operation, such as forward pushing, tilting and turning, and loading and unloading.

Therefore, there is a need for a wheelbarrow that employs the combined principles of physics for levering, for stability of wheeled vehicles during forward motion and during turning; an ergonomic handle design with multiple grips for easy lifting and unloading and a self-adjustable barrel-shaped ellipsoidal wheel that exhibits stability during forward motion, turning and lateral tilting, superior maneuverability and control and require minimal lifting and forward pushing as well as laterally counterbalancing forces by the operator.

SUMMARY OF THE INVENTION

The present invention relates to a manually operated wheelbarrow having a container, a pair of ergonomic handles with multiple grips extending rearwardly at the rear of the container to lift, push, maneuver, control and unload, and a support system underneath the container that consists of two vertical, serrated legs at the rear extending downwardly from the container, brackets at the front extending downwardly from the container to mount an axle and a barrel-shaped ellipsoidal wheel. In one exemplary embodiment, the wheelbarrow includes a smaller container mounted between the handles and rear side of the container to carry small tools and to add strength and rigidity to the handles. Also, in an exemplary embodiment, pairs of hooks may be mounted at the sides of the container to carry long tools.

The container is designed to front load and unload soil, aggregate, rocks, liquids and other materials. In an exemplary embodiment, there is, at the lowest position of the container, a short pipe with an outside screw-on cap. By disconnecting the cap and connecting a hose, the wheelbarrow can be loaded with and carry water to dispense the water at a designated location. The container of the wheelbarrow may also have indentations at the interior sides thereof on which a flat shelf can rest allowing the wheelbarrow to carry multiple materials, such as, for example, soil underneath the flat shelf as well as flower pots on top of the shelf. The wheelbarrow is self-balanced and self-stabilized and it is operated with minimal force and effort as a result of several factors: a barrel-shaped wheel, preferable ellipsoidal, mounting the wheel at a strategic position with respect to the center of gravity (CoG) of the wheelbarrow, and ergonomic design of the handles.

In an exemplary embodiment, the barrel-shaped ellipsoidal wheel is positioned underneath the container and at a short distance Δ forwardly of the CoG of the wheelbarrow. The distance Δ, is defined as the distance between a vertical line that passes through the CoG and the wheel axle when the wheelbarrow is in an at-rest, horizontal orientation. The shortest distance Δ is calculated so that as the wheelbarrow is lifted and its angle with the horizontal plane changes up to a normal lift of about 15°, the CoG shifts forward in the container and toward the axle. Although Δ decreases, it remains positive and the CoG remains rearwardly of the wheel axle. Depending on the wheelbarrow size, Δ is estimated to be within 4-8 inches (approx. 10-20 cm) rearwardly of the axle when in an at-rest, horizontal position. As a result, a wheelbarrow that moves on a downhill slope about 15°, although the CoG has moved forward, the CoG has not passed the point where the wheel makes contact with the ground and thus it remains stable. When the wheelbarrow is pushed on an uphill slope of about 15°, the wheelbarrow is near to a horizontal position and the CoG has not shifted substantially maintaining the distance Δ. Additionally, because the distance Δ is short with respect to the distance between the handles and the wheel axle, the required lifting force is a small fraction compared with the load the wheelbarrow carries.

The barrel shaped ellipsoidal wheel is self-balanced and self-stabilized during turns to left or right requiring minimal control and steer effort. In forward motion this barrel shaped wheel acts effectively like a single flat wheel. However, during turns, the wheelbarrow tilts to the left or to the right shifting the CoG to the left or to the right, respectively. In a typical wheelbarrow with a single flat wheel, as the CoG is displaced to the left or to the right, the CoG and the flat wheel create moment forces that cause the wheelbarrow to tip over laterally. In the wheelbarrow of the present invention, as the wheelbarrow tilts, the point of contact between the barrel shaped ellipsoidal wheel and the ground shifts by design to eliminate moment forces and maintain stability. Because of this, the wheelbarrow remains always stable and pushing, tilting, maneuvering and steering requires minimal effort (this makes it suitable for older people, people with arthritis, and others).

The handles of the wheelbarrow in an exemplary embodiment comprise a system having an ergonomic design, and includes multiple sets of ribbed grips for easy pushing and maneuvering and for easy unloading without requiring lifting the hands from one set of grips to another.

Underneath and at the rear of the container, there are two resting legs with serrated antiskid surfaces for self-braking on gradient ground. These legs may also have perforations so that height adjustments of the wheelbarrow from the ground can be made to suit the operator's height.

Other objects and advantages will become apparent to those skilled in the art from a review of the ensuing detailed description which proceeds from the following illustrative drawings.

BRIEF DESCRIPTION OF THE DRAWINGS

FIGS. 7A-7D are schematic views illustrating the stability triangle of a conventional front wheel wheelbarrow in the resting position and in a side tilted position;

FIGS. 8A-8C are schematic views of a wheelbarrow having a barrel shaped wheel of the present invention and illustrating the wheelbarrow at its at rest position, at a tilting position and showing the area of stability for the wheelbarrow in the tilted positions; and.

DETAILED DESCRIPTION

The present invention is a wheelbarrow that is self-balancing and self-stabilizing with a barrel-shaped ellipsoidal front wheel, requiring minimal lifting, pushing and tilting forces, with superior control and maneuverability and with ergonomic multi-grip handles.

The principles of operation of the wheelbarrow according to the present invention and how it differentiates from existing ones may be better understood with reference to the drawings and accompanied description.

In general, wheelbarrows are push containers that have one or two wheels mounted at the front, two handles mounted at the rear and two supporting legs at the rear of the container and extending downwardly therefrom. Operating a wheelbarrow effectively and efficiently is based on applying lifting and pushing forces to move forward and to balance the container on its wheel and combined pushing and counteracting lateral forces during turning. Lifting and balancing a loaded and heavy wheelbarrow can be difficult.

Figure 1:
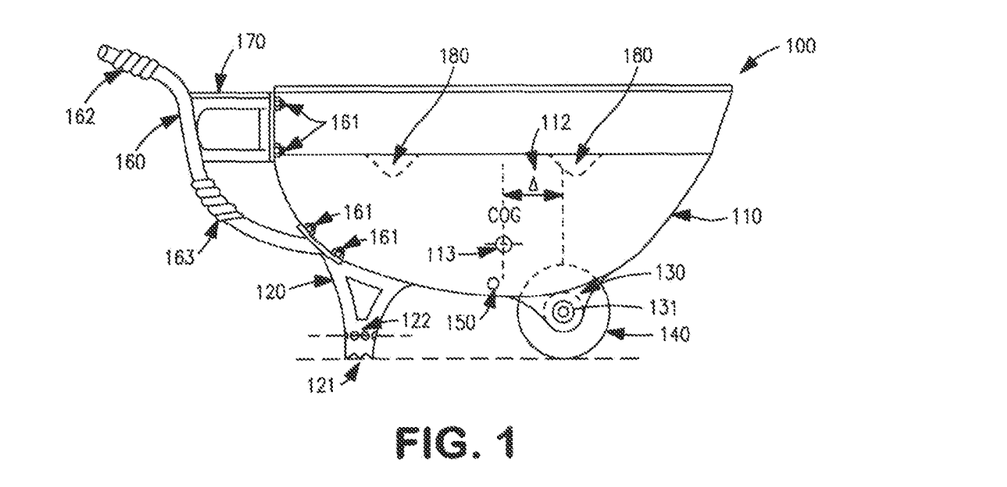
FIG. 1 is a side view of the wheelbarrow of the present invention showing the container, ergonomic multi-grip handle bars; the optional supplemental rear tool box between the handle bars; position of the rear serrated legs with perforations for height adjustment; the position of the front wheel with respect to center of gravity (CoG) of the wheelbarrow; the resting stops at the interior sides of container for adding an optional flat shelf, and the optional side attachment for hose connectivity.
Figure 2:
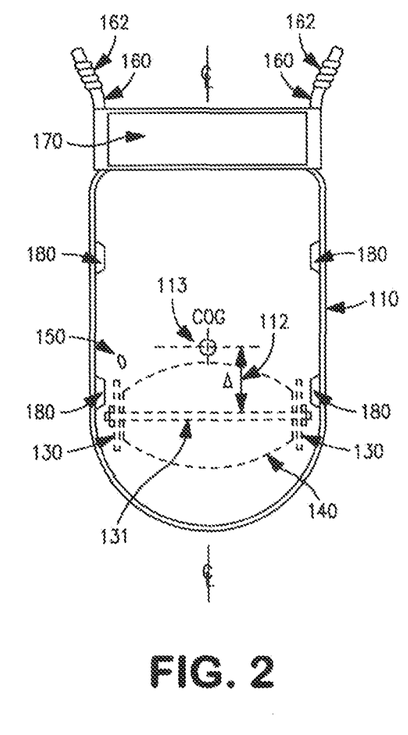
FIG. 2 is a top view of the wheelbarrow of FIG. 1.
Figure 3:
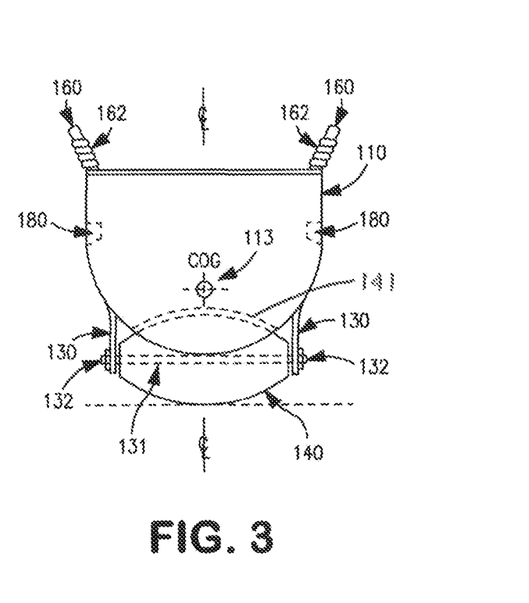
FIG. 3 is a front view of the wheelbarrow of FIG. 1.

Referring to FIGS. 1-3, FIG. 1 is a side view, FIG. 2 a top view and FIG. 3 a front view of a wheelbarrow 100 constructed in accordance with the present invention. The wheelbarrow consists of a container 110 with two rear legs 120 and two front vertical triangular-shaped brackets 130 extending downwardly from the container 100. The rear legs 120 are serrated at the bottom 121 so that when the wheelbarrow 100 rests on inclined ground it does not slip. The rear legs 120 include perforations 122 so that by cutting off a piece of the rear legs 120 at the perforations 122; the height of the wheelbarrow 100 from the ground is adjusted to accommodate the operator's height variability. Cutting at the perforations 122 creates shorter legs, yet serrated. The two vertical triangular-shaped brackets 130 each have a hole therethrough through which an axle 131 can pass. This axle 131 is preferable metal and is used to mount a barrel-shaped ellipsoidal wheel 140 underneath the container and at a distance Δ 112 from the CoG 113 of the container 110. A recess 141 is formed in the bottom of the container 110 in order to position the wheel 140 to achieve a low profile for the wheelbarrow 100 and to enhance stability. The axle 131 and the wheel 140 can be mounted by means of washers and lock-in nuts 132 or by other well established methods in wheel mounting. The front wheel 140 has a barrel-shaped design, such as ellipsoidal, with a round hole along its center of symmetry through which a sleeve (metal or plastic) can be pre-mounted during construction. The sleeve allows the axle 131 to pass through the wheel 140 and allow the wheel 140 to freely rotate with diameter tolerance (sleeve and axis) well-established in wheel design and wheel mounting. For example, a ~ to 1 inch diameter axle is typical for an average size wheelbarrow carrying up to 100 lbs load; the axle can be a solid bar (smaller diameter) or a hollow tube (larger diameter).

Underneath the container 110 and at about its deepest point there is a small tube 150 with an external screw-on plastic cap. By unscrewing the cap and connecting the small tube 150 to a garden hose, the wheelbarrow can serve as a water transporting and irrigating tank, for example, to irrigate a garden at a location with no water supply.

At the rear of the container 110 and extending rearwardly, there are two ergonomic handle bars 160 mounted with screws and washers 161 (metal or plastic); four screws per handle is deemed adequate for a typical garden wheelbarrow. The handle bars 160 are designed so that each has two (or more) sets of grips, that is, a pair of upper grips 162 and a pair of lower grips 163. The upper grips 162 are typically used to lift and move around the wheelbarrow 100 whereas the lower grips 163 are optionally used to front unload the wheelbarrow 100. Due to the continuous nature of the handle bars 160, the operator's hands can slide from the upper grips 162 to the lower grips 163 without letting the wheelbarrow 100 go at any moment. The two handle bars 160 are also designed so that they can accommodate between them an additional small box 170 that can be used to hold small tools and to also provide additional strength and rigidity between handle bars 160 and the container 110. The small box 170 is mounted at the handle bars 160 and at the rear side of the wheelbarrow 100 with screws and nuts or with well-known snap-on fasteners.

Figure 4:
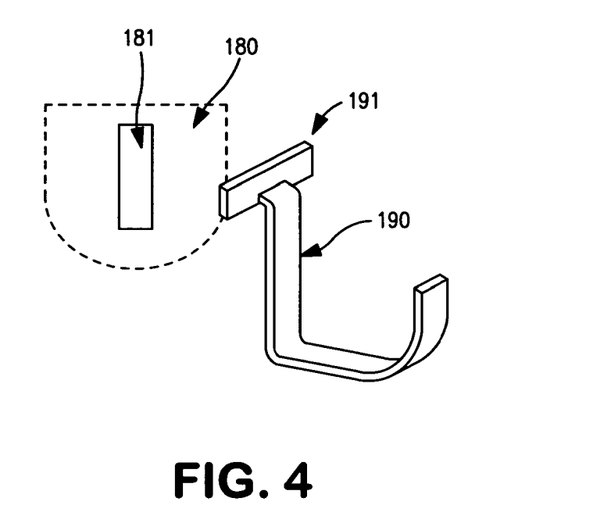
FIG. 4 is a perspective view of an exemplary embodiment illustrating a side hook with horizontal tab that may be mounted to the exterior side of the container (where the inside resting brackets are) for long tools.

Turning to FIG. 4, taken along with FIGS. 1-3, inside each of the two lateral sides of the container 110, and in the same horizontal plane, there are two low profile brackets 180 on which a flat shelf can rest. This allows the operator to carry at the same time two different types of material; for example, soil and pots, sand and gravel, water and cement, and so on. Each low profile bracket 180 forms an artificial small cavity so that at the outside of the container 110 and at the location of the brackets 180, there is a small vertical slit 181 through which an external hook 190 with a horizontal tab 191 can be mounted by aligning the tab 191 of the hook 190 with the slit 181, pass the tab 191 through the slit 181 and turn the hook 190 ninety (90) degrees to lock the hook 190 into position affixed to the container 110. The hooks 190 are used to carry long tools and they are easily removed, if so desired.

The principles and self-balancing and self-stabilizing operation of the wheelbarrow according to the present invention, why and how it differentiates from existing ones may be better understood with reference to the drawings that follow and accompanied description.

Figure 5A:
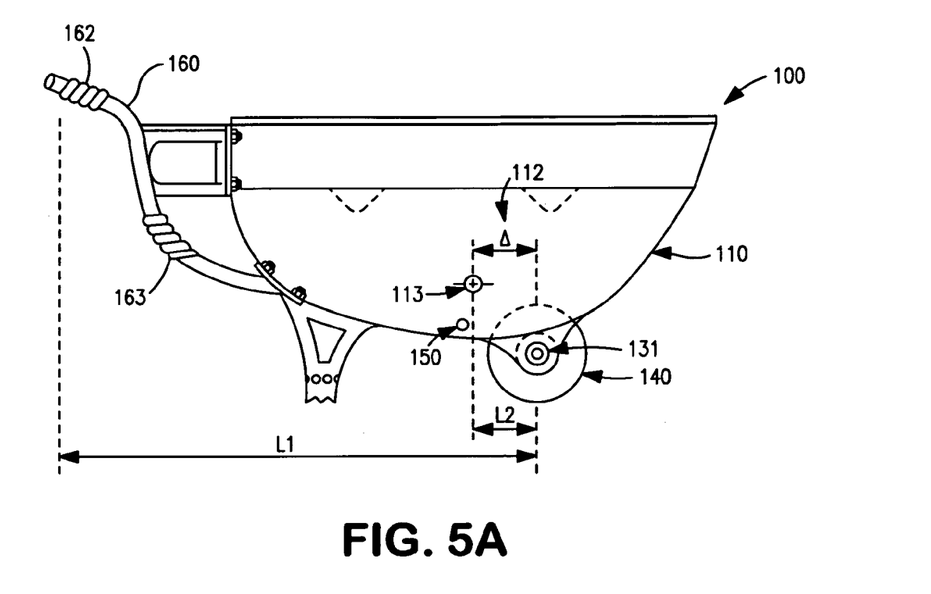
FIGS. 5A and 5B are side views of the wheelbarrow showing the position of the displaced center of gravity (CoG) at rest and after forward tilting with respect to the wheel.
Figure 5B:
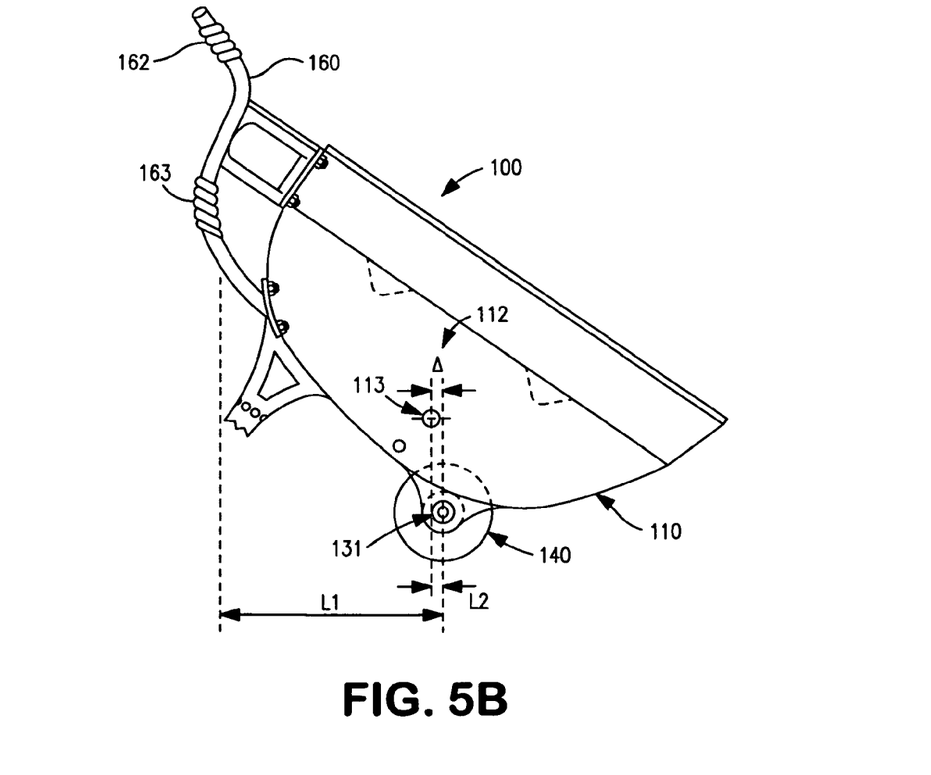

FIGS. 5A and 5B show side views of the wheelbarrow 100 of this invention at rest, (FIG. 5A) and when it is forward tilted (FIG. 5B) to depict the displacement of the center of gravity (CoG) 113 of the load with respect to the wheel axle 131. It will be appreciated that as the wheelbarrow is lifted, the CoG 113 moves forward and nearer the vertical through the wheel axle 131, thus decreasing the distance Δ 112. However, the CoG 113 still remains rearwardly with respect to the wheel axle 131 so that stability is maintained. According to physics, if the CoG passes the vertical through the wheel axle 131 such that the CoG is forward of the axle 131, then the wheelbarrow 100 tends to tip over forwardly as a result of forward moment forces particularly during forward unloading. In typical wheelbarrows, forward unloading requires a strong and well controlled pulling force by the operator to counterbalance the created tipping over moment force. In the wheelbarrow of this invention, the moments force is ameliorated by the barrel-shaped ellipsoidal wheel 140 that is located ahead of the actual CoG, so that by using the lower grips 163 of the handle bars 160 and, lifting the wheelbarrow 100, the CoG 113 moves toward the wheel axle 131 while it slowly empties its content. By the time the CoG 113 reaches the axle 131 and passes it, the actual load is minimal so that the generated moment force is negligible to require strong counterbalancing force by the operator.

Figure 6A:
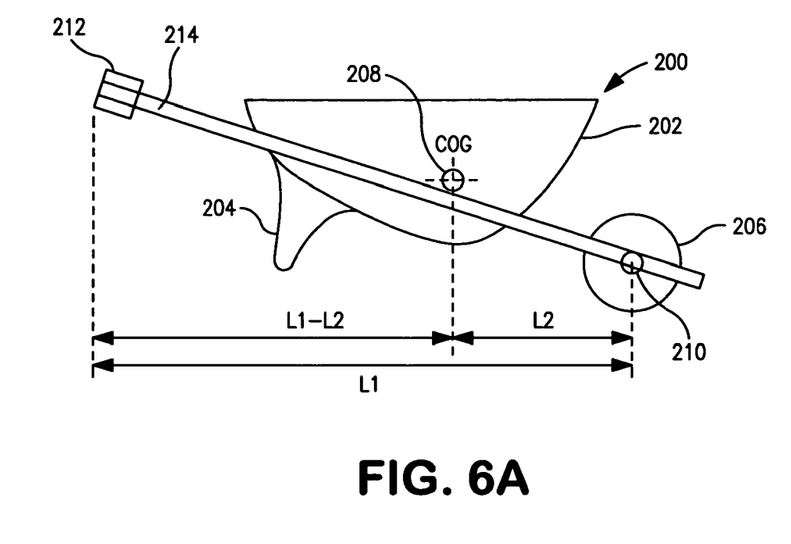
FIGS. 6A and 6B are side views of a conventional single wheel wheelbarrow showing the position of the center of gravity (CoG) at rest and after forward tilting with respect to the wheel.
Figure 6B:
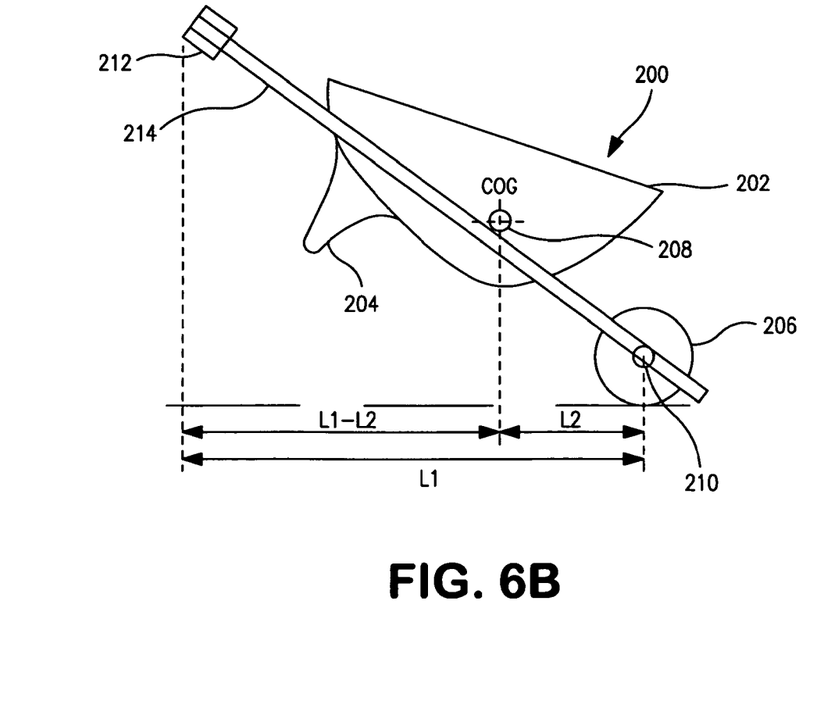

FIGS. 6A and 6B illustrate side views of a conventional wheelbarrow 200 to contrast the easy operation of the wheelbarrow of the present invention with conventional wheelbarrows. As can be seen, the wheelbarrow 200 comprises a container 202 with a pair of legs 204 extending downwardly therefrom and a front wheel 206. As can also be seen, the center of gravity or CoG 208 of the wheelbarrow 200 is located rearwardly with respect to the front wheel axle 210. In FIG. 6A, the wheelbarrow 200 is in its at rest position with the legs 204 and front wheel 206 resting on the ground in a generally horizontal orientation. In FIG. 6B the wheelbarrow 200 is forward tilted about the contact point of the front wheel 206 and the ground. In this case, when the physics lever equation is used, the lifting force is calculated as $LF=(L1/L2)W$, where LF is the required lifting force, L1 is the distance measured from the handle grip 212 (or operator's feet) on the handle bars 214 to the axle 210, L2 is the distance measured from the CoG to the axle 210, and W is the actual payload of the loaded wheelbarrow 200. For example, if the ratio L1/L2 is 3, then a lifting force 3 times smaller is required. At 100 lbs load, more than 30 lbs lifting force is required, which is continuously exerted on the operator's wrists and legs. However, because the ratio L1/L2 of the wheelbarrow of the present invention is by design small and less than ½0, then at 100 lbs load less than 5 lbs continuous lifting force is required.

Figure 7A:
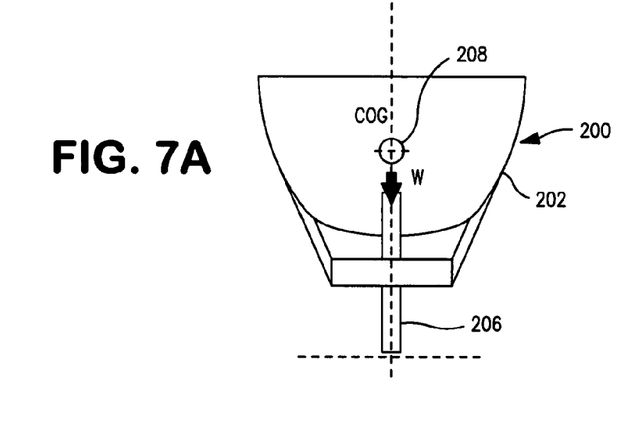
Figure 7B:
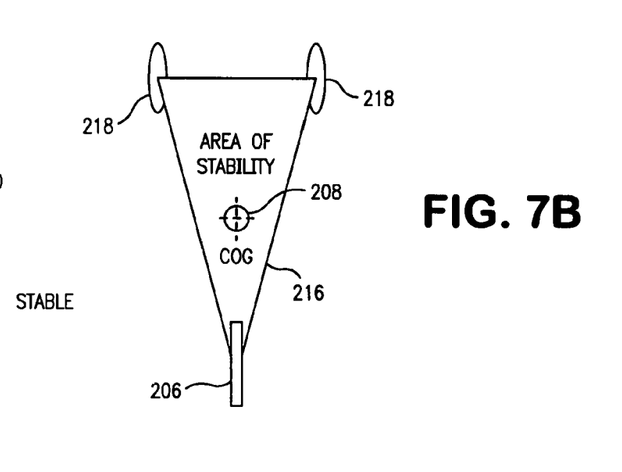
Figure 7C:
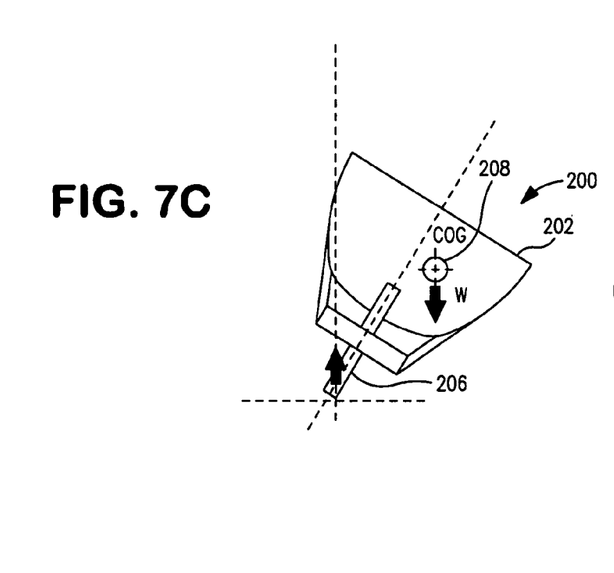
Figure 7D:
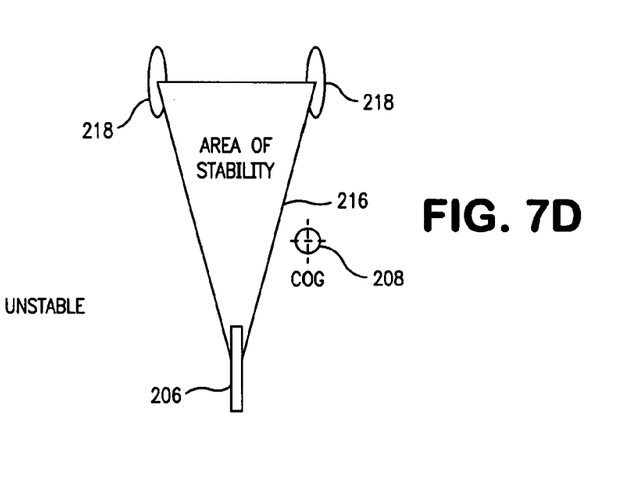

Turning now to FIGS. 7A-7D, there are schematic illustrations showing a conventional wheelbarrow 200 in an at rest position (FIG. 7A) and showing the corresponding area of stability for that at rest position (FIG. 7B) and schematic illustration showing the conventional wheelbarrow 200 in a side tilted position (FIG. 7C) and the corresponding area of stability for that tilted position (FIG. 7D). In both cases, the area of stability is a triangle. The stability triangle 216 is defined by the point of contact of the front wheel 206 with the ground and the points of contact 218 of the operator's legs during lifting and forward movement. According to physics, as long as the CoG 208 is vertically projected within the triangle of stability, the wheelbarrow 200 remains stable and it does not tip over. In the at rest position of FIG. 7A, the CoG 208 is well within the stability triangle 216 shown in FIG. 7B. However, as the wheelbarrow is tilted laterally during turns as shown in FIG. 7C, the CoG 208 shifts towards the left or right accordingly as the load within the container 202 shifts. In a typical front flat wheel wheelbarrow 200, during lateral tilts, the CoG often is projected outside the stability triangle as shown in FIG. 7D and the wheelbarrow 200 tends to tip over on its side unless a strong counterbalance force is applied by the operator to counteract the strong lateral moment force that is generated and to maintain stability.

Figure 8A:
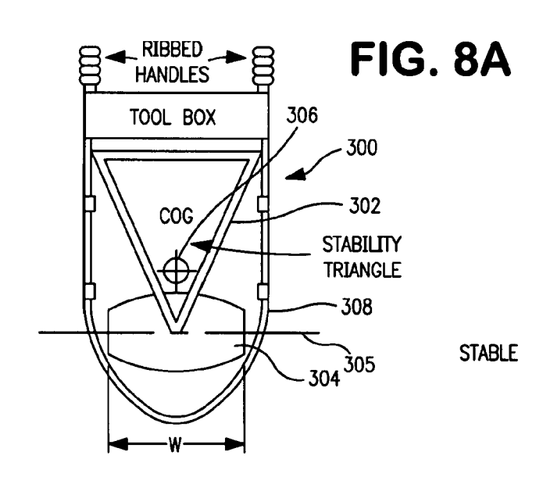
Figure 8B:
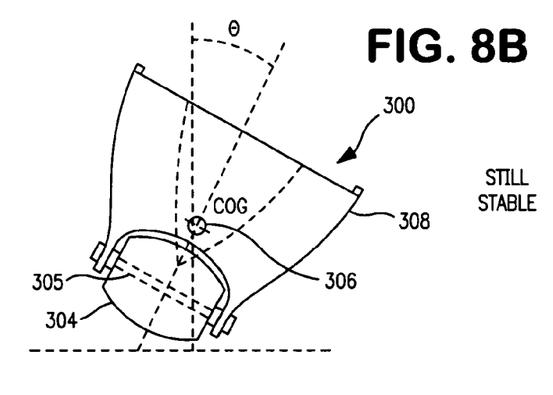
Figure 8C:
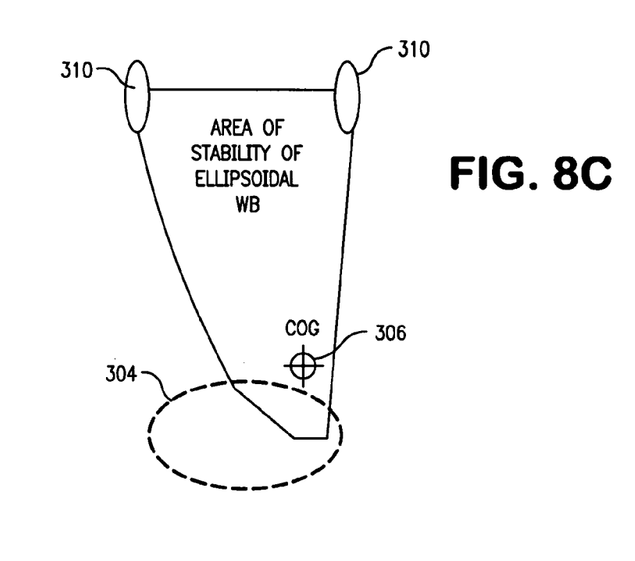

In contrast, as illustrated in FIGS. 8A-8C, the wheelbarrow 300 of the present invention can be seen to be self-adjusting. As such, in FIG. 8A, there can be seen the wheelbarrow 300 of the present invention and illustrating the area of stability triangle 302. As the wheelbarrow 300 tilts left or right, the point of contact of the barrel shaped ellipsoidal wheel 304 with the ground shifts accordingly so that the CoG 306 always remains within the area of stability. Thus the wheelbarrow 300 self-adjusts the stability area so that the shifting CoG 306 falls always within the area of stability triangle 302 to maintain stability.

Specifically, as the wheelbarrow 300 in this invention tilts left or right, the contact between the wheel 304 and the ground shifts laterally to the left or to the right, respectively, so that the CoG 306 of the shifted load in the container 308 remains above the contact between the wheel 304 and the ground and thus it always falls within the stability triangle. It is appreciated that the wheelbarrow 300 in this invention has a barrel-shaped ellipsoidal front wheel 304 having a predetermined width W and which is positioned underneath the container 308 with its axle 305 located a little forward of the CoG 306 of the loaded wheelbarrow 300. As can be seen, therefore, in FIG. 8C, the stability area between the wheel 304 and the points of contact 310 of the operator's legs is enlarged and is more like an area of stability in the shape of a trapezoid representative of the area of a wheelbarrow having two front wheels. Thus, with the present use of a barrel shaped wheel 304 having a predetermined width W, the wheelbarrow 300 has the stability of a wheelbarrow having two front wheels but the turning ability of a wheelbarrow having a single front wheel.

Figure 9:
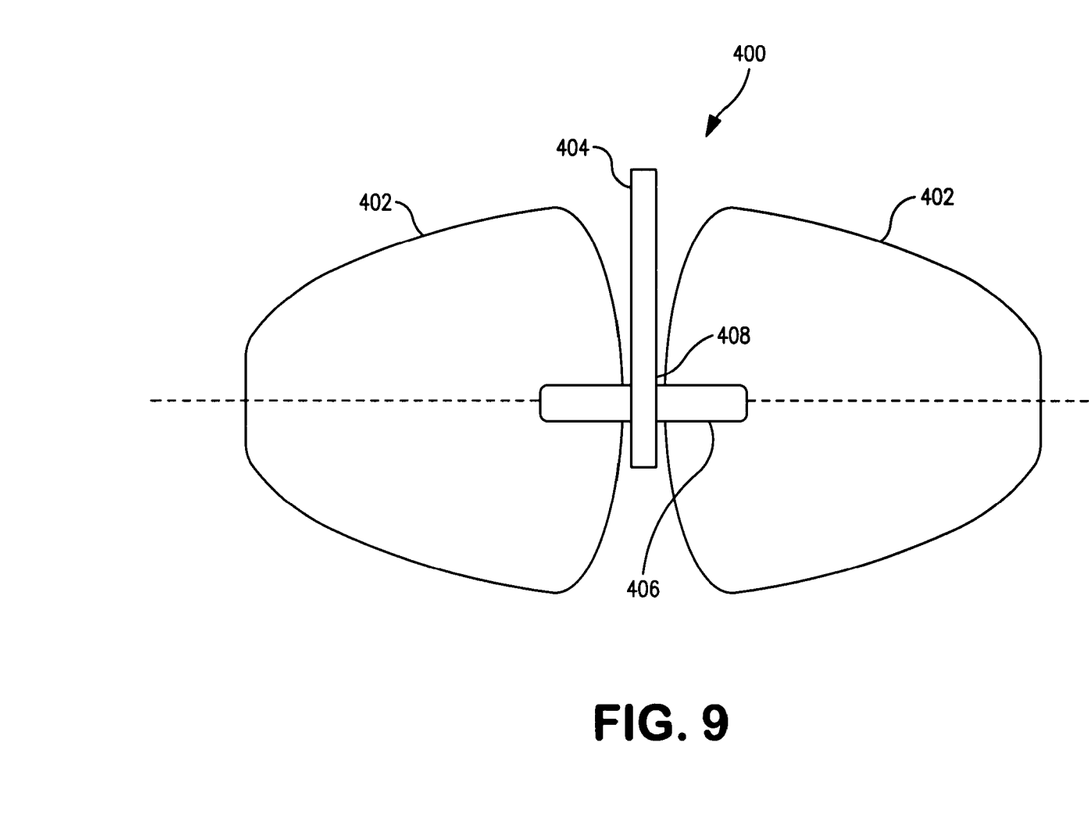
FIG. 9 is a front view of an alternate embodiment of a barrel-shaped ellipsoidal wheel that consists of two symmetric halves and with single mount at the center of symmetry.

Turning now to FIG. 9, there is shown a front view of a further exemplary embodiment where the front wheel 400 of a wheelbarrow is actually comprised of a pair of wheels 402 located toward the front end of the wheelbarrow where the wheels 402 are generally symmetrical, mirror images of each other and together forming a generally curved, barrel shaped configuration. With this embodiment, there can be a single wheel support 404 extending downwardly from the container (FIGS. 1-3) and supporting the wheels 402 by means of an axle 406 passing through a hole 408 at a location between the wheels at the center of symmetry.

In summary, the present invention uses the intelligent positioning of a barrel-shaped ellipsoidal wheel underneath a container having a predetermined width and by utilizing principles of physics combined with three-dimensional shapes to define a self-stabilizing and self-balancing multipurpose wheelbarrow for different loading conditions and operated with minimal controlling forces.

Those skilled in the art will appreciate that the above description and recitations are intended to serve only as examples to illustrate the merits of the wheelbarrow in this invention and that these principles and concepts can be utilized in a variety of embodiments which may vary but are considered to be within the scope of the present invention. Accordingly, it is understood that the present invention may take many forms and embodiments, and several variations may be made without departing from the spirit or scope of the invention. For this purpose, the present invention is not to be construed as being limited to the illustrative embodiment but also should be construed in view of the claims and the spirit of the invention.

What is claimed is:

1. A wheelbarrow for carrying materials, said wheelbarrow comprising a container shaped to hold the materials, the container having front and rear ends and a bottom having a recess formed therein that has a generally curved, barrel shaped configuration and extends at least substantially across the bottom of the container, a pair of handles extending from the rear end of the container for gripping by a user, a pair of wheels located toward the front end, said wheels being generally symmetrical, mirror images of each other and together forming a generally curved, barrel shaped configuration in the same shape as the recess, said wheels being located in said recess in the bottom of the container and combining to support the container in an at rest position and a side to side tilted position, and a wheel support extending downwardly from said frame and supporting said wheels at a location intermediate said wheels.

2. The wheelbarrow of claim 1 wherein said wheels include an axle passing between said wheels and said wheel support comprises a brace having a distal end extending downwardly from said container, said distal end having an opening therethrough, said axle passing through said opening to rotatably support said wheels.

3. The wheelbarrow of claim 1 wherein the overall combined outer surface of said wheel is ellipsoidal.

4. A wheelbarrow for carrying materials, said wheelbarrow comprising a container shaped to hold the materials, the container having front and rear ends and a bottom having a barrel shaped recess formed therein that extends at least substantially across the bottom of the container, a pair of handles extending from the rear end of the container for gripping by a user, a pair of legs and a barrel shaped wheel extending downwardly from the container and adapted to contact the ground and support the container in an at rest position and when the container is in a side to side tilted position, the wheelbarrow having a center of gravity in the at rest position, the barrel shaped wheel being located within said barrel shaped recess formed in the bottom of the container and toward the front end of the container, the barrel shaped wheel having a predetermined width, the predetermined width of the barrel shaped wheel being determined such that the normal side to side tilt of the container will not allow the center of gravity to move to a location vertically outside the predetermined width of the barrel shaped wheel.

5. The wheelbarrow of claim 4 wherein the barrel shaped wheel is ellipsoidal in shape.

6. The wheelbarrow of claim 4 wherein in said container includes a water inlet to allow water to enter into the container.

7. The wheelbarrow of claim 4 wherein said container has vertical slots and the wheelbarrow includes hooks that are adapted to interfit into said slots to affix hooks to the container.

8. The wheelbarrow of claim 4 wherein the container includes internal brackets adapted to support a shelf mounted within the container.

9. The wheelbarrow of claim 4 further including a small basket mounted intermediate the handle for holding articles.

10. A wheelbarrow for carrying materials, said wheelbarrow comprising a container shaped to hold the materials, the container having front and rear ends and a bottom having a barrel shaped recess formed therein that extends at least substantially across the bottom of the container, a pair of handles extending from the rear end of the container for gripping by a user, a pair of legs extending downwardly from the container and a barrel shaped wheel located within said barrel shaped recess in the bottom of the container and toward the front end of the container, the legs and the barrel shaped wheel adapted to contact the ground and support the container in an at rest position, the barrel shaped wheel adapted to contact the ground and support the container when the container is in a side to side tilted position, the wheelbarrow having a center of gravity at the at rest position, said barrel shaped wheel having a predetermined location intermediate the front and rear ends of the wheelbarrow proximate to but forward of the center of gravity, such that the normal forward vertical tilting of the wheelbarrow about the wheel retains the barrel shaped wheel directly below or forward of the center of gravity.

11. The wheelbarrow of claim 10 wherein the barrel shaped wheel is ellipsoidal in shape.

12. A method of constructing a wheelbarrow comprising:
   providing a container shaped to contain materials, the container having front, a rear end and a bottom having a barrel shaped recess formed therein that extends at least substantially across the bottom of the container, a pair of handles extending rearwardly from the rear end of the container and a support member and a barrel shaped wheel having a predetermined width extending downwardly from the container to contact the ground in an at rest position,
   locating the center of gravity of the wheelbarrow in the at rest position;
   installing the barrel shaped wheel rotatably to the container within said barrel shaped recess in the bottom of the container and at a location where normal side to side tilting of the wheelbarrow retains the barrel shaped wheel in contact with the ground supporting the container while retaining the center of gravity above and vertically within the width of the barrel shaped wheel.

13. The method of claim 12 wherein the step of providing a barrel shaped wheel comprises providing a wheel having an ellipsoidal outer shape.

\* \* \* \* \*